United States Patent [19]
Lang

[11] Patent Number: 6,003,430
[45] Date of Patent: Dec. 21, 1999

[54] RADIAL PISTON PUMP

[75] Inventor: Johannes Lang, Oberreichenbach, Germany

[73] Assignee: INA Walzlager Schaeffler oHG, Germany

[21] Appl. No.: 09/008,981

[22] Filed: Jan. 20, 1998

[30] Foreign Application Priority Data

Mar. 20, 1997 [DE] Germany ............ 197 11 557

[51] Int. Cl.$^6$ .................................... F01B 1/06
[52] U.S. Cl. ................. 92/12.1; 92/58; 92/72; 417/273
[58] Field of Search ............... 92/12.1, 58, 72; 417/273

[56] References Cited

U.S. PATENT DOCUMENTS

| | | | |
|---|---|---|---|
| 5,230,275 | 7/1993 | Hodge et al. | 417/273 X |
| 5,642,988 | 7/1997 | Zorn | 417/273 |

FOREIGN PATENT DOCUMENTS

| | | |
|---|---|---|
| 8116704 | 3/1982 | France . |
| 4430909 | 3/1946 | Germany . |
| 1208124 | 12/1965 | Germany . |
| 1949489 | 11/1966 | Germany . |
| 1268444 | 5/1968 | Germany . |
| 2047420 | 3/1972 | Germany . |
| 7310156 | 7/1972 | Germany . |
| 7302217 | 9/1973 | Germany . |
| 2447908 | 4/1975 | Germany . |
| 2649939 | 6/1977 | Germany . |
| 3931709 | 3/1990 | Germany . |
| 3840691 | 6/1990 | Germany . |
| 9014393 | 2/1991 | Germany . |
| 4204631 | 10/1992 | Germany . |
| 4119860 | 12/1992 | Germany . |
| 4315826 | 11/1994 | Germany . |
| 4331625 | 3/1995 | Germany . |
| 4444646 | 6/1996 | Germany . |

*Primary Examiner*—Hoang Nguyen
*Attorney, Agent, or Firm*—Bierman, Muserlian and Lucas

[57] ABSTRACT

The eccentric end portion (5) of a pump shaft (3) is mounted in a needle roller bearing (6) which comprises a sheet metal bushing (9) and needle rollers (7) guided in a cage (8), wherein the end of the sheet metal bushing (9) remote from the pump shaft (3) is provided with a closed bottom (18) to prevent a displacement of the sheet metal bushing (9) in axial direction.

14 Claims, 3 Drawing Sheets

RADIAL PISTON PUMP

FIELD OF THE INVENTION

A radial piston pump having a rotating pump shaft on whose end portion is arranged a shaft journal extending eccentric to the central longitudinal axis of the pump shaft, a needle roller bearing comprising an outer ring made as a sheet metal bushing being arranged on the shaft journal, and pump plungers extending radially to the pump shaft in a star pattern within a pump housing being supported with end faces on said outer ring.

BACKGROUND OF THE INVENTION

A radial piston pump of this type is known from DE 42 04 631 A1. High radial loads exerted by the pump plungers cause a thrust load in the eccentric bearing which acts in the direction of the motor i.e., in the direction of the pump shaft and can lead to wear of the eccentric bearing arrangement due to contact of the outer ring of the eccentric bearing with surrounding components.

OBJECTS OF THE INVENTION

It is an object of the invention to create a radial piston pump of the pre-cited type which is free of the aforesaid drawbacks and to provide a rolling bearing arrangement on the eccentric shaft portion which can absorb thrust forces.

This and other objects and advantages of the invention will become obvious from the following detailed description.

SUMMARY OF THE INVENTION

The radial piston pump of the invention having a rotating pump shaft (3) on whose end portion is arranged a shaft journal (5) extending eccentric to a central longitudinal axis of the pump shaft (3), a needle roller bearing (6) comprising an outer ring made as a sheet metal bushing (9) being arranged on the shaft journal (5), and pump plungers (12) extending radially to the pump shaft (3) in a star pattern within a pump housing (2) being supported with end faces on said outer ring, is characterized in that, at an end remote from the pump shaft (3), the sheet metal bushing (9) comprises a closed bottom (18) adapted to abut against an end face of the shaft journal (5).

Due to the provision of the bottom, the sheet metal bushing can be displaced axially in the presence of thrust forces only until the bottom of the bushing abuts against the end face of the shaft journal. A further axial displacement is not possible so that the flange of the sheet metal bushing opposed to the bottom is prevented from coming into contact with adjacent components.

According to one feature of the invention, the bottom comprises an elevation oriented towards the shaft journal which assures that only a part of the bottom, and not the entire bottom, bears against the shaft journal thus reducing friction.

In an alternative solution, the invention achieves its objects by the arrangement of a stop disc in the sheet metal bushing at a shaft-remote end thereof, which stop disc is adapted to abut against the end face of the shaft journal. Compared to the first solution, this embodiment of the invention has the advantage that, due to the absence of the bottom, the sheet metal bushing has a uniform rigidity over its entire axial extent. This uniform rigidity, in its turn, has a favorable effect on the thrust behavior of the sheet metal bushing.

In a further modification of the invention, the stop disc is domed towards the shaft journal which measure serves to diminish friction between the sheet metal bushing and the shaft journal because only a part of the radial extent of the stop disc bears against the shaft journal.

The stop disc is retained with radial clearance in the sheet metal bushing. Due to this radial clearance between the sheet metal bushing and the stop disc, the stability of the sheet metal bushing remains unaffected.

According to a further characteristic of the invention, a depression is arranged at the center of the stop disc for receiving lubricant so that friction between the stop disc and the shaft journal is further reduced.

According to another feature of the invention, the stop disc comprises a rotation-preventing means which assures that the stop disc is not subjected to any additional rotary movement within the sheet metal bushing.

According to still another feature of the invention, improved lubrication and a reduction of friction can be achieved by making the journal-proximate surface of the stop disc with a honeycomb structure.

In still another modification of the invention, a shaft-distal outer rim of a cage of the needle roller bearing has a larger axial dimension than a second rim of the cage. This asymmetric geometry of the cage rims effects a displacement of the point of load application by the piston plungers so that a controlled axial displacement of the sheet metal bushing towards the pump shaft is assured up to the point where the sheet metal bushing comes to abut against the eccentric shaft journal. By this controlled axial displacement, the sheet metal bushing is prevented from abutting against the part of the housing situated opposite the pump shaft.

According to still another feature of the invention, longitudinal axes of the cage pockets of the cage of the needle roller bearing are arranged angularly offset to the longitudinal axis of the pump shaft. This offset position of the pockets of the bearing cage likewise produces a defined thrust in the direction of the pump shaft i.e., in the direction of the motor so that a displacement of the sheet metal bushing is stopped at the desired point.

According to the invention, the angle of offset between the longitudinal axes of the cage pockets of the needle roller bearing and the longitudinal axis of the pump shaft is 1 to 2°.

BRIEF DESCRIPTION OF THE DRAWINGS

The invention will now be described with reference to the following examples of embodiment shown in the drawings.

DETAILED DESCRIPTION OF THE DRAWINGS

Figure 1:
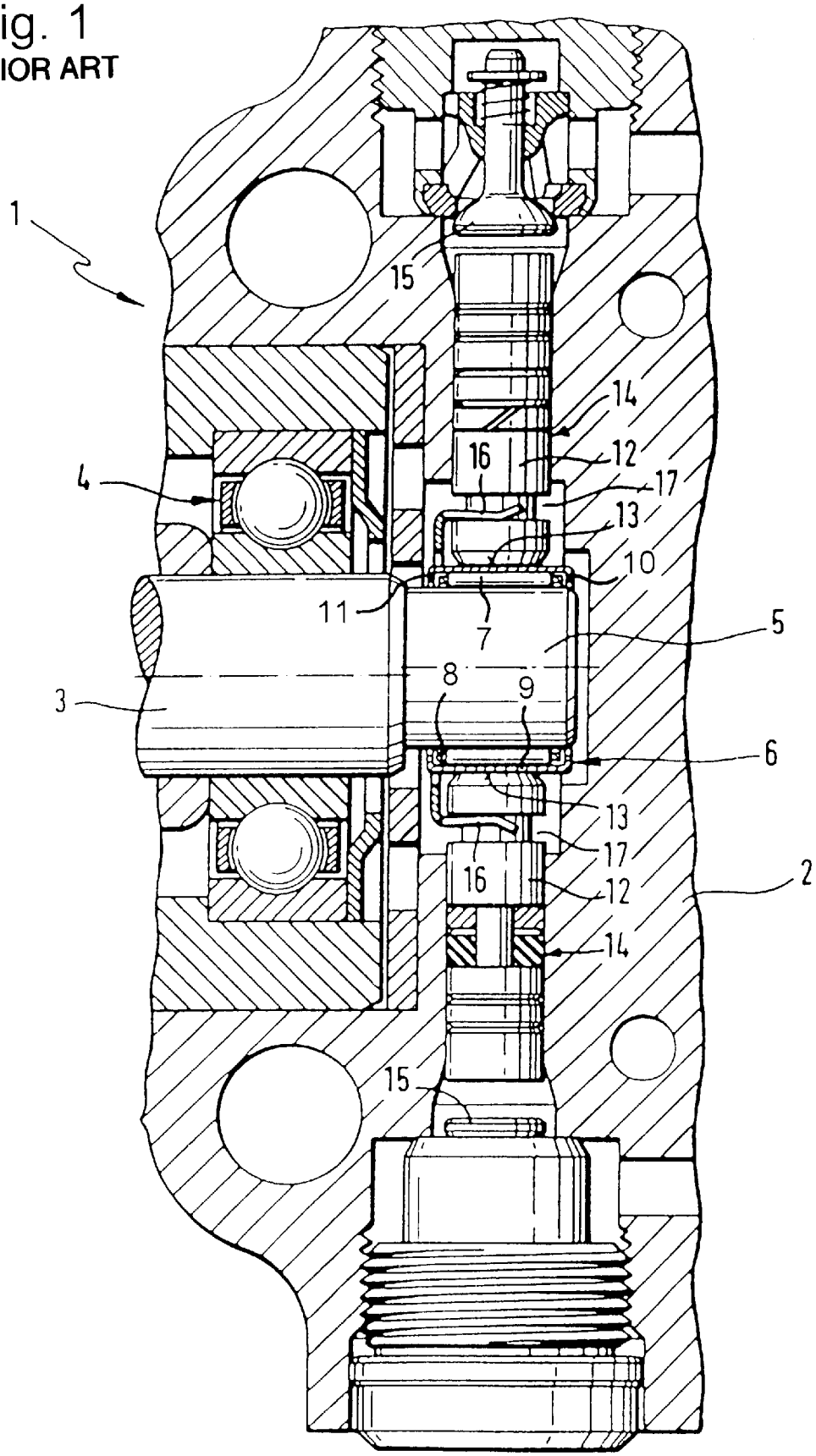
FIG. 1 is a partial longitudinal cross-section through a radial piston pump of the prior art having a needle roller bearing arranged on the eccentric shaft journal of a pump shaft.

To illustrate the context of the invention, reference is first made to FIG. 1 in which a radial piston pump identified at 1 comprises a housing 2 in which a pump shaft 3 is mounted with the help of a ball bearing 4. On an end portion, the pump shaft 3 comprises a shaft journal 5 which is arranged eccentric to the central longitudinal axis of the pump shaft 3. A needle roller bearing 6 arranged on the shaft journal 5 comprises cylindrical, needle-shaped rolling elements 7 retained in a cage 8, and an outer ring which is made without chip removal in the form of a sheet metal bushing 9 having end flanges 10 and 11. A plurality of pump plungers 12, of which two are visible in the sectional representation, are guided on the outer peripheral surface of the sheet metal bushing 9. The pump plungers 12 extend radially in a star pattern relative to the sheet metal bushing 9 of the needle roller bearing 6 with their end faces 13 touching the sheet metal bushing 9.

Each of the pump plungers 12 is arranged in a cylindrical pressure chamber 14 made directly in the housing 2. An inlet valve 15 is associated to each pump plunger 12, and due to the oscillating movement of the pump plungers 12, hydraulic pressure medium is sucked in through said inlet valves 15 and fed via bores and pressure ducts, not shown, into the pressure system of an anti-locking device for the brakes of a vehicle. Leaf springs 16 guided on the sheet metal bushing 9 engage into a groove 17 provided on each pump plunger 12. These leaf springs 16 assure a permanent contact between the end faces 13 of the pump plungers 12 and the sheet metal bushing 9.

The strong load exerted by the pump plungers 12 at high speeds of rotation produces a thrust which displaces the sheet metal bushing 9 of the needle roller bearing 6 towards the pump shaft 3. Under such conditions, the flange 11 of the sheet metal bushing 9 can come to abut against adjacent components in certain types of installations. Such an abutment of the sheet metal bushing 9 is precluded by the invention.

Figure 2:
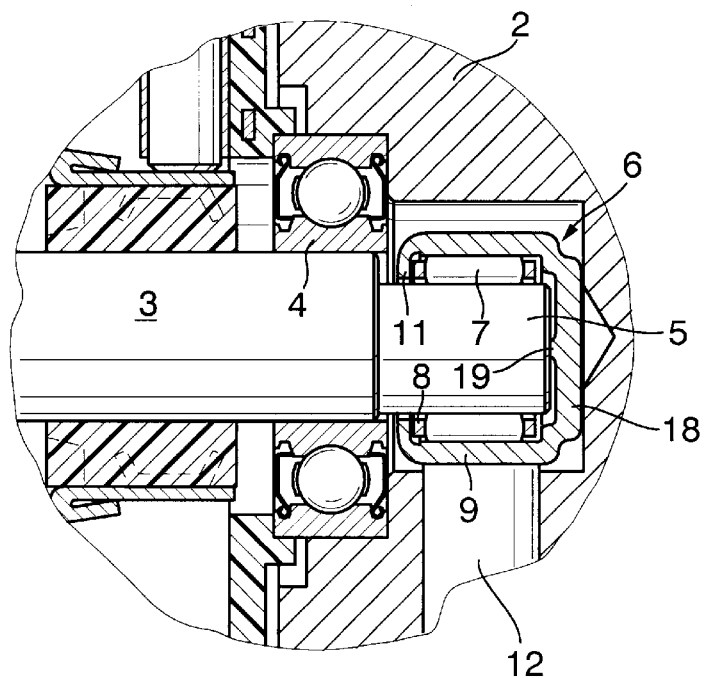
FIG. 2 is an enlarged partial view of a radial piston pump with a shaft 25 journal mounted in accordance to the invention, FIGS. 3, 5, and 6 each show a longitudinal cross-section through a needle roller bearing of the invention.

As can be seen in FIG. 2, the end of the sheet metal bushing 9 further away from the pump shaft 3 is provided with a closed bottom 18 which comprises a central elevation 19 termed a stopping boss. When an axial load is exerted by the pump plungers 12 on the sheet metal bushing 9 in the direction of the pump shaft 3, the sheet metal bushing 9 can be displaced axially to the left only till the elevation 19 comes to bear against the end face of the shaft journal 5. In this way, the flange 11 of the sheet metal bushing 9 is prevented from coming into contact with adjacent components.

Figure 3:
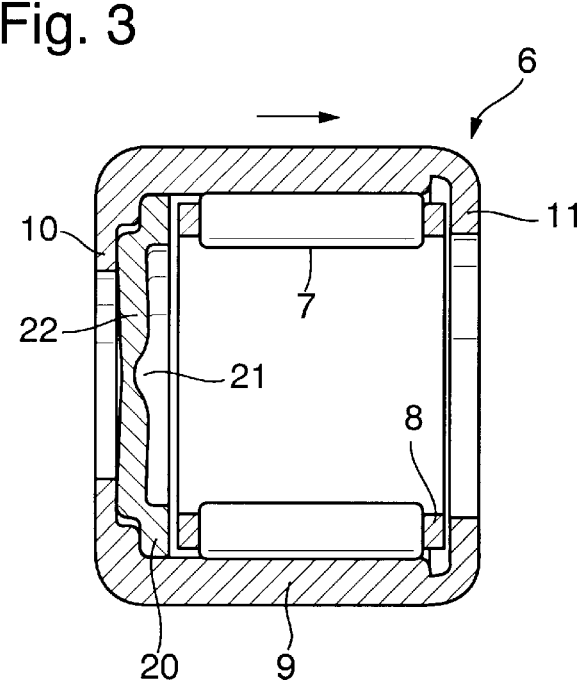
Figure 4:
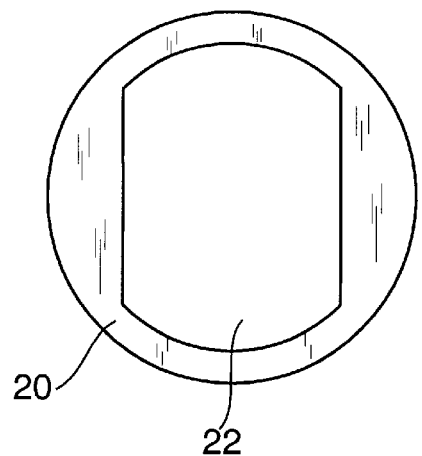
FIG. 4 is a top view of a stop disc of FIG. 3.

The stop disc identified as 20 in FIGS. 3 and 4 is arranged in the sheet metal bushing 9 at a shaft-distal end thereof. In this case too, upon occurrence of an axial force in the direction of the arrow, the sheet metal bushing 9 can only be displaced till the end face of the shaft journal 5, not shown in these figures, bears against the stop disc 20. As can be seen further in FIG. 3, the stop disc 20 is domed towards the shaft journal 5 which means that the shaft journal 5 bears only against a portion of the bottom of the stop disc 20 which leads to a reduction of friction. FIG. 3 also shows that the stop disc 20 comprises a central depression 21 which, when filled with grease, contributes to a further reduction of friction. The stop disc 20 is arranged with a radial clearance in the sheet metal bushing 9 so that the rigidity of the sheet metal bushing 9 is not influenced by the stop disc 20. From FIG. 4, it can be seen that the stop disc 20 comprises an anti-rotation means 22 which engages into a corresponding recess in the flange 10. This results in an effective prevention of rotation of the stop disc 20.

Figure 7:
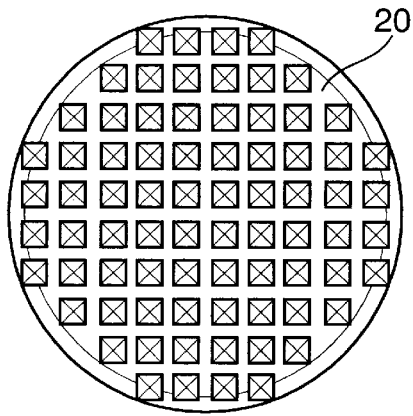
FIG. 7 is a top view of a stop disc of the invention.
Figure 8:
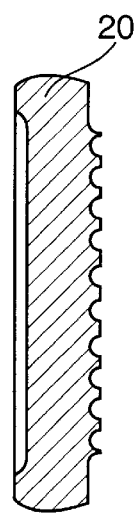
FIG. 8 is a longitudinal cross-section of the stop disc of FIG. 7.

FIGS. 7 and 8 show that the surface of the stop disc 20 facing the shaft journal 5 can also be made with a honeycomb structure which then forms the abutting surface for the shaft journal 5. This honeycomb structure with its elevations and depressions has a better retaining capacity for lubricant than a smooth surface.

Figure 5:
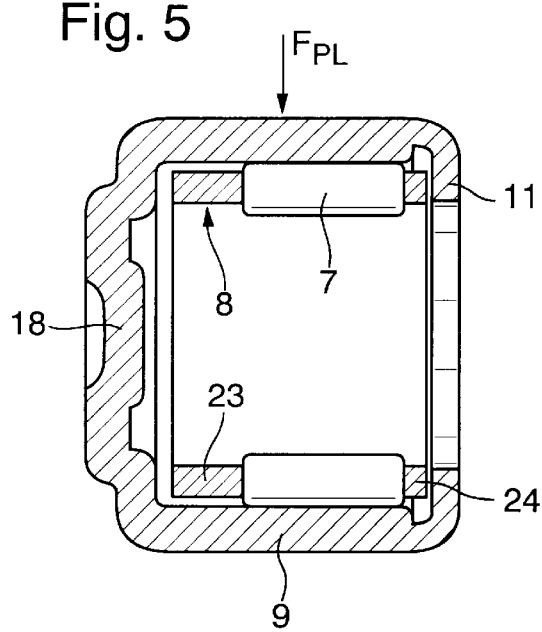

FIG. 5 shows a sheet metal bushing 9 comprising a cage 8 whose outer rim 23, further away from the pump shaft 3 has a larger axial dimension than a second rim 24, nearer the pump shaft 3. The axial dimension of the needle rollers 7 is thus shortened i.e., the position of the needle rollers 7 with respect to the position of the point of load application is changed. Although this load, designated as $F_{PL}$, is applied at the center of the peripheral surface of the sheet metal bushing 9, it does not coincide with the axial center of the needle rollers 7 so that a controlled thrust is exerted on the sheet metal bushing 9 in the direction of the pump shaft 3. The bottom 18 of the sheet metal bushing 9 then comes to abut against the end face of the shaft journal 5 in the manner described earlier. This controlled thrust, in FIG. 5 towards the right, has the advantage that the sheet metal bushing 9 does not manifest an indefinite behavior i.e., its bottom 18 cannot abut towards the left against the housing 2.

Figure 6:
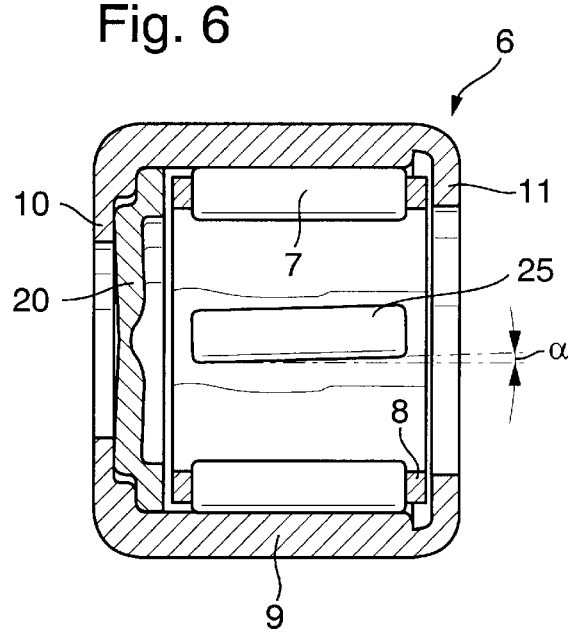

The cage 8 of the needle roller bearing 6 shown in FIG. 6 comprises needle rollers 7 retained in pockets 25 whose longitudinal axes are arranged angularly offet to the longitudinal axis of the pump shaft 3. This offset position of the pockets 25 likewise assures the controlled thrust exerted on the sheet metal bushing 9 towards the pump shaft 3 as described above.

Various modifications of the radial piston pump of the invention may be made without departing from the spirit or scope thereof and it is to be understood that the invention is intended to be limited only as defined in the appended claims.

What I claim is:

1. A radial piston pump (1) having a rotating pump shaft (3) on whose end portion is arranged a shaft journal (5) extending eccentric to a central longitudinal axis of the pump shaft (3), a needle roller bearing (6) comprising an outer ring made as a sheet metal bushing (9) being arranged on the shaft journal (5), and pump plungers (12) extending radially to the pump shaft (3) in a star pattern within a pump housing (2) being supported with end faces on said outer ring, characterized in that, at an end remote from the pump shaft (3), the sheet metal bushing (9) comprises a closed bottom (18) adapted to abut against an end face of the shaft journal (5).

2. A radial piston pump (1) of claim 1 wherein the bottom (18) comprises an elevation (19) oriented towards the shaft journal (5).

3. A radial piston pump (1) having a rotating pump shaft (3) on whose end portion is arranged a shaft journal (5) extending eccentric to a central longitudinal axis of the pump shaft (3), a needle roller bearing (6) comprising an outer ring made as a sheet metal bushing (9) being arranged on the shaft journal (5), and pump plungers (12) extending radially to the pump shaft (3) in a star pattern within a pump housing (2) being supported with end faces on said outer ring, characterized in that, a stop disc (20) is arranged in the sheet metal bushing (9) at a shaft-remote end thereof, which stop disc (20) is adapted to abut against an end face of the shaft journal (5).

4. A radial piston pump (1) of claim 3 wherein the stop disc (20) is domed towards the shaft journal (5).

5. A radial piston pump (1) of claim 3 wherein the stop disc (20) is retained with radial clearance in the sheet metal bushing (9).

6. A radial piston pump (1) of claim 3 wherein a depression (21) is arranged at a center of the stop disc (20).

7. A radial piston pump (1) of claim 3 wherein the stop disc (20) comprises a rotation-preventing means (22).

8. A radial piston pump (1) of claim 3 wherein a journal-proximate surface of the stop disc (20) is made with a honeycomb structure.

9. A radial piston pump (1) of claim 1 wherein a shaft-distal outer rim (23) of a cage (8) of the needle roller bearing (6) has a larger axial dimension than a second rim (24) of the cage (8).

10. A radial piston pump (1) of claim 3 wherein a shaft-distal outer rim (23) of a cage (8) of the needle roller bearing (6) has a larger axial dimension than a second rim (24) of the cage (8).

11. A radial piston pump (1) of claim 1 wherein longitudinal axes of cage pockets (25) of a cage (8) of the needle roller bearing (6) are arranged angularly offset at an angle $\alpha$ to the longitudinal axis of the pump shaft (3).

12. A radial piston pump (1) of claim 3 wherein longitudinal axes of cage pockets (25) of a cage (8) of the needle roller bearing (6) are arranged angularly offset at an angle $\alpha$ to the longitudinal axis of the pump shaft (3).

13. A radial piston pump (1) of claim 11 wherein the angle $\alpha$ is 1 to 2°.

14. A radial piston pump (1) of claim 12 wherein the angle $\alpha$ is 1 to 2°.

* * * * *